Patented Aug. 16, 1932

1,872,161

UNITED STATES PATENT OFFICE

JOHN McGAVACK, OF LEONIA, NEW JERSEY, ASSIGNOR TO THE NAUGATUCK CHEMICAL COMPANY, OF NAUGATUCK, CONNECTICUT, A CORPORATION OF CONNECTICUT

PRESERVATION OF LATEX

No Drawing.  Application filed August 27, 1930. Serial No. 478,279.

The invention relates to improvements in the art of preserving latex.

An object of this invention is to provide a latex showing high fluidity, high mechanical stability, substantially no residue upon evaporation due to added preservative, and which also gives a dried rubber having less water absorptive properties. Another object is to provide a fluid, liquid formaldehyde preserved latex which is so maintained over a substantial period of time. A further object is to provide an improved solid rubber which gives superior abrasion and flexing qualities and which is less absorptive to water. Other objects and advantages will be apparent from the description below.

It is old to preserve latex with formaldehyde which serves mainly as an anti-putrefactive agent. It is also old to preserve latex with ammonia which serves mainly as an anti-coagulant. Latex preserved with formaldehyde has only a limited life in substantially its original state; the latex thickens, is not stable after a time and is not readily pumped, handled or compounded. The rubber produced therefrom however has little water absorptive properties due probably to the tanning action of the formaldehyde on the latex proteins. On the other hand latex preserved with ammonia shows high fluidity, high mechanical stability and also shows substantially no residue due to the preservative. Rubber obtained therefrom, however, shows higher water absorptive properties than rubber from formaldehyde preserved latex. It is generally known that formaldehyde and ammonia react to give a rubber accelerator and the joint use of the two preservatives under ordinary circumstances would undesirably modify the properties of the rubber produced. Again if ammonia and formaldehyde are mixed and then added to latex the latex is no better preserved than with the use of ammonia alone. By the invention disclosed herein, however, the advantages attendant the separate uses of formaldehyde and ammonia are maintained and a rubber made available which has substantially no increased acceleration value over rubber produced from ordinary ammonia preserved latex. This is brought about by due consideration of the separate influences of formaldehyde and ammonia upon latex and results from treating the latex with the two materials in a particular manner.

The invention accordingly broadly comprises preserving latex by treating it first with formaldehyde and subsequently adding the ammonia. The formaldehyde is preferably one in which there is present substantially no free acid such as formic acid, an oxidation product of formaldehyde. The formaldehyde is added to the latex and sufficient time allowed for proper absorption and diffusion of the formaldehyde throughout the latex. The time will vary according to the amount of formaldehyde used. The time elapsing between the addition of formaldehyde and subsequent addition of ammonia should accordingly be regulated and chosen to provide a condition where there remains no substantial excess of free formaldehyde to react with the ammonia to form a rubber accelerator. The formaldehyde may be the customary formaldehyde that is used to preserve latex. A commercial formaldehyde is suitable and may be added in various small amounts, for example from .1 to 1 part. The ammonia is that which is customarily used in preserving latex and may also be added in various small amounts, for example from .1 to 5 parts. The latex treated may be of various concentrations and the quantity of preservatives should correspondingly conform to the latex treated.

The following is illustrative of the invention but is not to be construed as limiting thereof. The parts are by weight:

*Example 1.*—Latex as received from the tree is treated with .2 parts of formaldehyde and allowed to stand for about 24 hours and then .5 part ammonia is added thereto. Good preservation is obtained giving the physical properties mentioned above. The latex so treated produces a rubber having its proteins tanned or reacted upon by formaldehyde and which rubber is less absorptive to water. The sprayed dried-latex is a rubber having superior milling qualities. If desired suitable compounding and curing agents may be added to the latex before drying.

The time of standing may be considerably shortened if a check is run on a sample of rubber from the latex to find a time of standing which will provide a rubber giving substantially no increased cure over a rubber obtained from using the ammonia alone as the preserving agent.

By this invention the present cost of preserving latex can be reduced and a formaldehyde preserved latex provided which will withstand shipment from abroad in the same manner as ordinary ammonia preserved latex. At the present time shipment of ordinary formaldehyde preserved latex is difficult due to the tendencies of such latex to coagulate particularly where it is shipped in large bulk and has to be pumped into and from storage containers.

It is to be understood that instead of adding ammonia, any equivalent thereof may be used such as the substituted ammonias for instance alkylamines such as trimethlamine, triethylamine, tetra-ethyl ammonium compounds etc., and the claims are to be so construed.

Having thus described my invention, what I claim and desire to protect by Letters Patent is:

1. A method of preserving latex which comprises first adding a small amount of formaldehyde to latex, allowing the latex to stand and subsequently adding a small amount of ammonia at a time when there remains no substantial excess of free formaldehyde in the latex.

2. A method of preserving latex which comprises causing latex to absorb a small amount of formaldehyde and subsequently treating the latex with a small amount of ammonia at a time when there remains no substantial excess of free formaldehyde in the latex.

3. Rubber produced from a latex preserved according to the process of claim 1.

4. A spray dried latex rubber produced from latex preserved according to the process of claim 1.

5. A spray dried rubber produced from latex preserved according to the process of claim 2.

Signed at New York, county of New York, and State of New York, this 25th day of August, 1930.

JOHN McGAVACK.